(12) United States Patent
Cho

(10) Patent No.: US 11,153,018 B2
(45) Date of Patent: Oct. 19, 2021

(54) ELECTRONIC DEVICE AND METHOD FOR CONTROLLING ELECTRONIC DEVICE

(71) Applicant: SAMSUNG ELECTRONICS CO., LTD., Suwon-si (KR)

(72) Inventor: Seongyu Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/957,980

(22) PCT Filed: Feb. 21, 2019

(86) PCT No.: PCT/KR2019/002150
§ 371 (c)(1),
(2) Date: Jun. 25, 2020

(87) PCT Pub. No.: WO2019/164307
PCT Pub. Date: Aug. 29, 2019

(65) Prior Publication Data
US 2020/0336225 A1      Oct. 22, 2020

(30) Foreign Application Priority Data

Feb. 21, 2018   (KR) ................. 10-2018-0020511

(51) Int. Cl.
*H04B 17/00*      (2015.01)
*H04B 17/23*      (2015.01)
(Continued)

(52) U.S. Cl.
CPC ........... *H04B 17/23* (2015.01); *H04B 17/318* (2015.01); *H04W 4/023* (2013.01); *H04W 4/027* (2013.01);
(Continued)

(58) Field of Classification Search
CPC ... H04B 17/318; H04B 17/23; H04W 64/006; H04W 64/003; H04W 4/023; H04W 4/27; H04W 36/03; H04W 36/32
See application file for complete search history.

(56) References Cited

U.S. PATENT DOCUMENTS

2006/0104245 A1   5/2006  Narayanaswami et al.
2008/0130604 A1   6/2008  Boyd
(Continued)

FOREIGN PATENT DOCUMENTS

| EP | 3 048 518 | 7/2016 |
| KR | 10-2017-0000281 | 1/2017 |
| WO | 2008/070044 | 6/2008 |

OTHER PUBLICATIONS

International Search Report for PCT/KR2019/002150, dated Apr. 9, 2019, 4 pages.
(Continued)

*Primary Examiner* — Nhan T Le
(74) *Attorney, Agent, or Firm* — Nixon & Vanderhye, P.C.

(57) ABSTRACT

An electronic device is disclosed. The disclosed electronic device comprises: a communication circuit; a display; a processor; and a memory electrically connected to the processor, wherein the memory may store commands set so that the processor controls the display to display, on a narrow and long area extending along at least one edge area formed on the display, a user interface comprising location information of an external device to and from which a signal is transmitted and received via the communication circuit. Other various embodiments are possible.

19 Claims, 10 Drawing Sheets

(51) Int. Cl.
  *H04B 17/318* (2015.01)
  *H04W 4/02* (2018.01)
  *H04W 36/30* (2009.01)
  *H04W 36/32* (2009.01)
  *H04W 64/00* (2009.01)

(52) U.S. Cl.
  CPC ........... *H04W 36/30* (2013.01); *H04W 36/32* (2013.01); *H04W 64/003* (2013.01); *H04W 64/006* (2013.01)

(56) References Cited

U.S. PATENT DOCUMENTS

| | | |
|---|---|---|
| 2014/0064123 A1 | 3/2014 | Kim |
| 2014/0118631 A1* | 5/2014 | Cho .......................... H04S 7/30 348/836 |
| 2014/0162690 A1 | 6/2014 | Sheikman et al. |
| 2014/0370917 A1 | 12/2014 | Buchheim et al. |
| 2015/0074690 A1* | 3/2015 | Park .......................... G06F 9/54 719/328 |
| 2016/0219411 A1 | 7/2016 | Tenant de la Tour et al. |
| 2016/0224299 A1 | 8/2016 | Lim et al. |
| 2017/0003874 A1* | 1/2017 | Grupinski ........... G06F 3/04883 |
| 2018/0242242 A1* | 8/2018 | Lee ....................... H04M 1/724 |

OTHER PUBLICATIONS

Written Opinion of the ISA for PCT/KR2019/002150, dated Apr. 9, 2019, 5 pages.
Extended Search Report dated Nov. 18, 2020 in counterpart European Patent Application No. 19756865.2.

* cited by examiner

ELECTRONIC DEVICE AND METHOD FOR CONTROLLING ELECTRONIC DEVICE

This application is the U.S. national phase of International Application No. PCT/KR2019/002150 filed 21 Feb. 2019, which designated the U.S. and claims priority to KR Patent Application No. 10-2018-0020511 filed 21 Feb. 2018, the entire contents of each of which are hereby incorporated by reference.

TECHNICAL FIELD

Various embodiments of the disclosure relate to a method of providing notification in an electronic device.

BACKGROUND ART

Recently, functions of electronic devices have been diversified. For example, there are functions for data communication, photography and video shooting through a camera, video recording, voice recording, music file playback through a speaker system, and output of images or videos to a display.

In addition, the use of wireless Internet services is increasing along with an increase in the number of users who watch videos or listen to music by streaming using electronic devices. In this case, the quality of wireless fidelity (Wi-Fi) services is becoming more important as the number of cases where the Wi-Fi Internet is used without using data from mobile carriers is increasing.

Since the current electronic device simply displays the signal strength of a wireless access point (AP) when Wi-Fi Internet is used, it may be difficult for the electronic device to know a direction in which the wireless AP is located.

SUMMARY

Technical Problem

Therefore, the disclosure has been made in view of the above-mentioned problems, and an aspect of the disclosure is to provide an electronic device that guides a user to know and access the location of a wireless AP and a method of controlling the same.

The technical problems to be achieved in this disclosure are not limited to the technical problems mentioned above, and other technical problems not mentioned will be clearly understood by those skilled in the art from the following description.

An electronic device according to an embodiment may include: a communication circuit; a display; a processor; and a memory configured to be electrically connected to the processor, wherein the memory stores instructions which are configured to cause the processor to display a user interface including location information of an external device that transmits and receives a signal through the communication circuit, in a narrow and long region extended along at least one edge region formed in the display, by controlling the display.

A method of controlling an electronic device may include: acquiring location information of an external device that transmits and receives a signal through a communication circuit; and displaying a user interface including the location information of the external device in a narrow and long region extended along at least one edge region of a display.

A computer program product according to an embodiment may include a computer-readable recording medium that stores instructions for executing operations of acquiring location information of an external device that transmits and receives a signal through a communication circuit; and displaying a user interface including the location information of the external device in a narrow and long region extended along at least one edge region of a display.

An electronic device according to an embodiment of the disclosure may guide the direction of a wireless AP to a user, so that the user can easily increase the wireless Internet signal strength of the electronic device.

An electronic device according to an embodiment of the disclosure may guide the direction of a wireless AP using a narrow and long extended region formed in an edge region of a display, so that a user can easily recognize the direction of a wireless AP while performing various operations using the electronic device.

DETAILED DESCRIPTION OF EXAMPLE EMBODIMENTS

Figure 1:
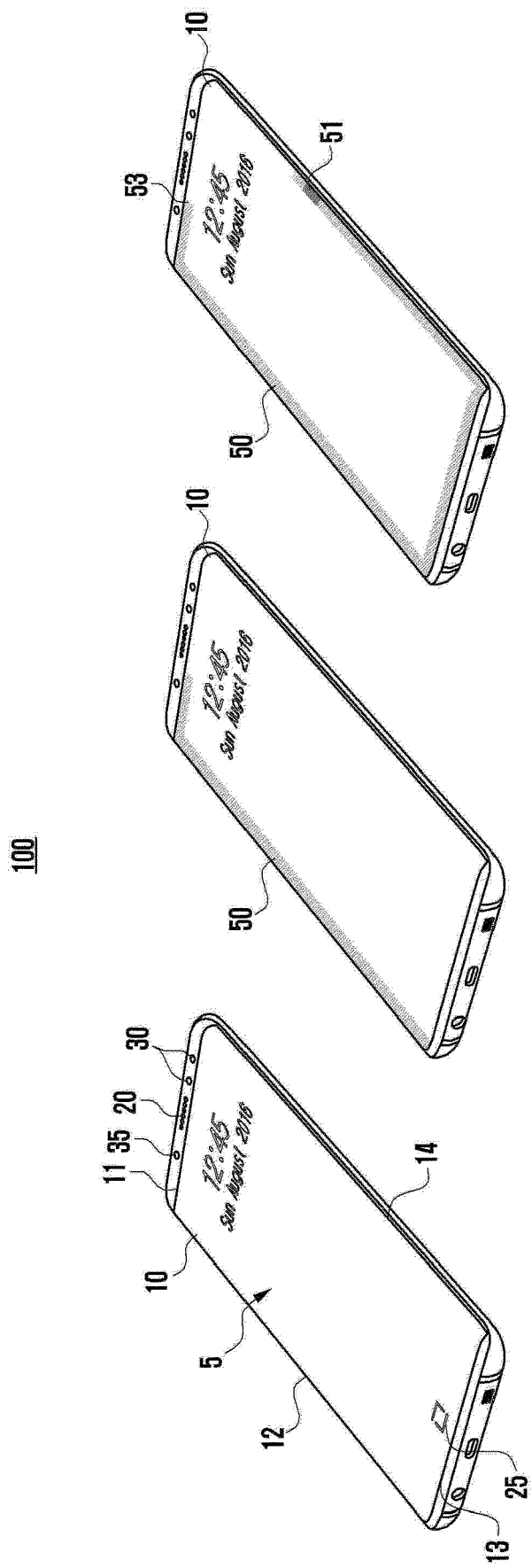
FIGS. 1A, 1B, and 1C are diagrams illustrating an electronic device according to an embodiment and a situation in which the electronic device displays a user interface on a display.

An electronic device according to various embodiments of the disclosure may be one of various types of devices. The electronic device may include, for example, at least one of a portable communication device (e.g., a smart phone), a computer device, a portable multimedia device, a portable medical device, a camera, a wearable device, or a home appliance. The electronic device according to the embodiment of the disclosure is not limited to the above-described devices.

It should be understood that the various embodiments of the document and the terms used therein are not intended to limit the technology described in this document to specific embodiments, and include various modifications, equivalents, and/or substitutes of the embodiments. In connection with the description of the drawings, similar reference numerals may be used for similar components. Singular expressions may include plural expressions unless the context clearly indicates otherwise. In this document, expressions such as "A or B" or "at least one of A and/or B" may include all possible combinations of the items listed together. Expressions such as "first," "second," "first," or "second," can modify the corresponding component regardless of order or importance, and a component can be modified by other components. It is used to distinguish from elements and does not limit the corresponding components. When one (e.g.: first) component is "connected (functionally or communicatively)" or "connected" to another (e.g., second) component A component described above can be directly connected to another component described above, or can be connected via another component (e.g., a third component).

Hereinafter, various embodiments of the disclosure will be described with reference to the accompanying drawings.

FIGS. 1A to 1C are diagrams illustrating an electronic device according to an embodiment and a situation in which the electronic device displays a user interface on a display.

Referring to FIG. 1A, the electronic device 100 may be implemented with devices for various purposes. For example, as described above, the electronic device 100 may be implemented as a mobile phone, a smart phone, a laptop computer, a tablet device, a wearable device, or the like, but is not limited thereto.

Referring to FIG. 1A, a display 10 may be located on a front surface 5 of an electronic device 100. The display 10 may be provided in the form of a touch screen superimposed with a touch panel. According to an embodiment, the display 10 may include a curved surface. For example, the display 10 may include a curved surface in an edge region adjacent to an edge thereof.

Referring to FIG. 1A, the display 10 of the electronic device 100 may include a first edge region 11, a second edge region 12, a third edge region 13, and a fourth edge region 14. The display 10 of the electronic device 100 according to an embodiment may form a curved surface in the second edge region 12 and the fourth edge region 14, and may not form a curved surface in the first edge region 11 and the third edge region 13. However, the disclosure is not limited thereto, and the display 10 may form curved surfaces in all the four edge regions 11, 12, 13 and 14.

According to an embodiment, a speaker 20 for outputting a voice signal may be positioned above the electronic device 100. A home key 25 may be positioned in the form of a soft key below the display 10. However, the type of the home key 25 implemented as the soft key is not limited thereto.

According to an embodiment, the electronic device 100 may include components for performing various functions mounted around the speaker 20.

According to an embodiment, the components may include at least one sensor module 30. For example, the components may include at least one of an illuminance sensor (e.g., an optical sensor), a proximity sensor, an infrared sensor, and an ultrasonic sensor. According to an embodiment, the components may include a camera (or the camera module 35). According to an embodiment, the components may include a light emitting diode (LED) indicator for allowing a user to recognize the status information of the electronic device 100.

Referring to FIGS. 1B and 1C, the electronic device 100 may display a user interface 50 in one region of the display 10. When an externally generated signal is received or when an event occurs within the electronic device 100, the electronic device 100 may display a user interface 50 that notifies the reception of the signal or the occurrence of the event.

According to an embodiment, the event occurring within the electronic device 100 may include, for example, a change in wireless fidelity (Wi-Fi) reception sensitivity, a change in a distance from an external device in which a communication relationship is established, a predetermined alarm, a change in an internal system state, or the like. A signal received from the outside of the electronic device 100 may include, for example, text message reception, telephone reception, and the like.

The user interface 50 may include a variety of property information. The property information may include at least one of, for example, the form of the user interface 50 (e.g., a surface, a line, etc.), the color of the user interface 50 (e.g., hue, brightness, saturation, or effect {gradation effect, flickering effect, etc.}), the movement effect (e.g., movement using pixel value control, movement by continuous display of a plurality of images, etc.) of the user interface 50, a direction in which the movement effect of the user interface 50 proceeds, a speed at which the movement effect of the user interface 50 proceeds, a start point and an end point for displaying the movement effect, or the time during which the user interface 50 is displayed.

According to an embodiment, the electronic device 100 may display the user interface 50 using the at least one of the above-described property information. According to various embodiments, the electronic device 100 may provide the user with an option capable of changing (or selecting) the property of the user interface 50.

Referring to FIG. 1B, the electronic device 100 may display the user interface 50 on at least one edge region of the display 10. The user interface 50 may be provided in a form of displaying a predetermined color in a narrow and long form (e.g., a surface, a line, etc.) along the edge region. In this case, the user interface 50 may be referred to as an edge-lighting user interface.

According to an embodiment, the user interface 50 may be provided in a form of displaying a predetermined color or blinking. Referring to FIG. 1B, the electronic device 100 may display the user interface on the first edge region 11 and the second edge region 12, and may not display on the other edge regions.

According to various embodiments, the user interface 50 may exhibit effects such as moving along the edge region of the display 10.

Referring to FIG. 1C, the user interface 50 may include a start point 51 or an end point 53. The electronic device 100 may exhibit an effect such that the user interface 50 moves along the edge region using a method such as the pixel value control of the display 10 or the continuous display of the plurality of images.

Figure 2:
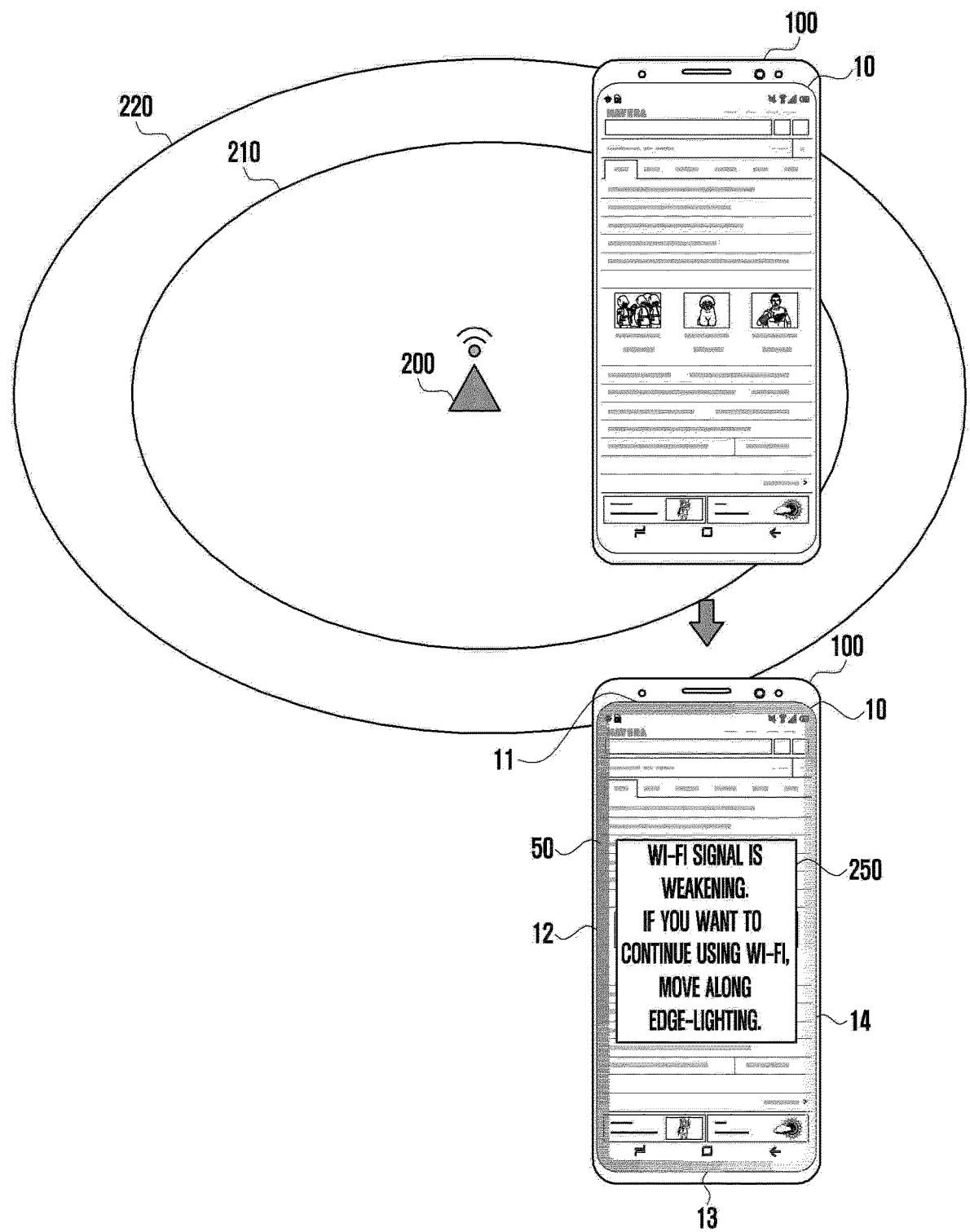
FIG. 2 is a diagram illustrating a situation in which a user interface is displayed while a distance between an electronic device according to an embodiment and an external electronic device increases.

FIG. 2 is a diagram illustrating a situation in which a user interface is displayed while a distance between an electronic device according to an embodiment and an external electronic device increases.

Referring to FIG. 2, the electronic device 100 and the external device 200 may be in a state of establishing a communication relationship using a wireless communication system. For example, when the electronic device 100 is located in a communication possible area of the external device 200, the two devices may establish a communication relationship. The external device 200 may be, for example, at least one of a Wi-Fi access point (AP), a repeater, and other electronic devices.

According to an embodiment, when the electronic device 100 moves away from the external device 200, the communication transmission/reception sensitivity between the electronic device 100 and the external device 200 may be reduced. At this time, the electronic device 100 may notify the user of an increase in a distance between the electronic device 100 and the external device 200 and a decrease in the communication transmission/reception sensitivity using the user interface.

Hereinafter, a communication system of the electronic device 100 and a method of measuring a position between the electronic device 100 and the external device 200 according to an embodiment will be described.

According to an embodiment, the electronic device 100 may use various communication systems.

The communication system may use different wireless interfaces and/or physical layers. For example, the wireless interface available by the communication system may include frequency division multiple access, time division multiple access, code division multiple access, a general-purpose mobile communication system (e.g., long term evolution (LTE) or long term evolution-advanced (LTE-A)), a global system for mobile communication (GSM), and the like.

The mobile communication system may be linked with, for example, a global positioning system (GPS) to confirm the location of the electronic device 00. The GPS may acquire useful location information using two or fewer or more satellites.

According to an embodiment, the electronic device 100 may include a location information module. The location information module may be to detect, calculate, or identify the location of the electronic device 100, and may typically include a GPS module or a Wi-Fi module.

The GPS module may calculate, for example, distance information and time information from three or more satellites, and then may apply trigonometry to the calculated information to obtain three-dimensional (3D) current location information according to latitude, tilt, and altitude. According to various embodiments, a method of calculating location and time information using three satellites and correcting errors of the calculated location and time information using another one satellite may be used.

Further, the electronic device 100 may calculate movement speed information of the electronic device 100 by continuously calculating the current location of the electronic device 100 in real time using the GPS module. However, the accuracy of the location of the electronic device 100 using the GPS module may be lowered in a shaded area of satellite signals, such as indoors. Accordingly, a Wi-Fi positioning system (WPS) may be used to supplement positioning in a GPS method.

The WPS may use a technology for tracking the location of the electronic device 100 using a Wi-Fi module provided in the electronic device 100 and a wireless AP that transmits or receives a wireless signal to or from the Wi-Fi module, and may refer to a wireless local area system (WLAN)-based positioning technology.

The WPS may include a Wi-Fi positioning server, the electronic device 100, the wireless AP 200 connected to the electronic device 100, and a database in which arbitrary wireless AP information is stored.

The electronic device 100 connected to the wireless AP 200 may transmit a location information request message (or signal) to the Wi-Fi positioning server.

The WPS may extract information of the wireless AP 200 connected to the electronic device 100, based on the location information request message of the electronic device 100. The information of the wireless AP 200 connected to the electronic device 100 may be transmitted to the Wi-Fi positioning server through the electronic device 100, or may be transmitted to the Wi-Fi positioning server from the wireless AP 200.

The information of the wireless AP 200 extracted based on the location information request message of the electronic device 100 may be at least one of, for example, MAC address, service set identification (SSID), received signal strength indicator (RSSI), reference signal received power (RSRP), reference signal receive quality (RSRQ), channel information, signal strength, network type, and noise strength.

The Wi-Fi positioning server may receive the information of the wireless AP 200 connected to the electronic device 100 and may extract, from the database, wireless AP information corresponding to the wireless AP 200 to which the electronic device 100 is being connected. In this case, information of arbitrary wireless APs stored in the database may be at least one of MAC address, SSID, channel information, network type, latitude and longitude coordinates of the wireless AP, location of the wireless AP (e.g., building name, floor number, indoor location, etc.), and wireless AP owner information (e g., name, contact information, etc.).

The Wi-Fi positioning server according to an embodiment may extract (or analyze) the location information of the electronic device 100 using the wireless AP information extracted from the database. For example, the positioning server may calculate the location of the electronic device 100 based on a distance between the coordinates of at least three wireless APs and the electronic device 100. To measure the distance between the electronic device 100 and the wireless AP 200, the Wi-Fi positioning server may convert the signal strength into distance information, or may use a time at which a wireless signal is transmitted, a difference in the time at which the signal is transmitted, and an angle at which the signal is transmitted, and the like. Various other methods can be used.

The Wi-Fi positioning server may transmit the extracted location information of the electronic device 100 (e.g., a relative distance and direction of the electronic device 100 with respect to the wireless AP 200) to the electronic device 100.

According to various embodiments, the electronic device 100 may measure the location of an external device (e.g., the wireless AP 200) using a plurality of Wi-Fi antenna modules included in the electronic device 100. For example, the electronic device 100 may transmit a Tx ping (packet Internet grouper) to the external device (e.g., the wireless AP 200) using a plurality of Wi-Fi modules at a predetermined period. The electronic device 100 may perform phase calculation using the transmission/reception time of the Tx ping, and may acquire the location information (e.g., the relative distance and direction of the wireless AP 200 with respect to the electronic device 100) of the external device (e.g., the wireless AP 200).

Referring to FIG. 2, the electronic device 100 may move in a direction outside the communication possible area of the wireless AP 200. The communication possible area may include, for example, a first area 210 in which communication is smoothly performed and a second area 220 in which communication is possible with the first area 210, but the data transfer rate is reduced. For example, when the wireless AP 200 is a Wi-Fi AP, the first area 210 may be 18 to 20 m, and the second area 220 may be 28 to 30 m. However, the disclosure is not limited thereto, and a range of the communication possible area may vary according to the performance of the Wi-Fi AP.

According to an embodiment, when the electronic device 100 moves out of the first area 210 and moves to the second area 220 and a distance from the wireless AP 200 increases, the electronic device 100 may confirm that the communication transmission/reception sensitivity with the wireless AP 200 decreases.

When the communication transmission/reception sensitivity with the wireless AP 200 decreases because the distance from the wireless AP 200 increases, the electronic device 100 according to an embodiment may display the user interface 50 on the display 10. The electronic device 100 may display the user interface 50 along, for example, at least one edge region of the display 10.

According to an embodiment, the electronic device 100 may display a direction in which the wireless AP 200 is located using the user interface 50. For example, the electronic device 100 may display the user interface in the first edge region 11 and the second edge region 12 adjacent to the direction in which the wireless AP 200 is located.

According to an embodiment, the electronic device 100 may display the user interface 50 having a predetermined color and shape in the first edge region 11 and the second edge region 12. For example, the electronic device 100 may display the user interface 50 in a narrow and long shape along the first edge region 11 and the second edge region 12. In this case, the electronic device 100 may apply the gradation effect to the user interface 50 to display even a portion of the third edge region 13 adjacent to the second edge region 12 and a portion of the fourth edge region 14 adjacent to the first edge region 11 with a color to which the gradient effect is applied.

According to various embodiments, the electronic device 100 may display the user interface 50 by applying a flickering effect. However, the disclosure is not limited thereto. The electronic device 100 may apply various image effects to the user interface 50.

According to an embodiment, the electronic device 100 may display information indicating a decrease in the reception sensitivity simultaneously or sequentially with the user interface 50 on the display 10. For example, the electronic device 100 may display the information indicating the decrease in the reception sensitivity and the content requesting to move the electronic device 100 in a direction guided by the user interface 50 on the display 10 as a pop-up message 250.

The electronic device 100 may display the pop-up message 250 for a predetermined time and then may terminate the display. The electronic device 100 may display the pop-up message 250 in a flickering form for a predetermined time. However, the disclosure is not limited thereto, and the electronic device 100 may continue to display the pop-up message 250.

The user may check the location at which the user interface 50 is displayed on the display 10 to know a region in which the wireless AP 200 is located. The user may move the electronic device 100 in a direction in which the wireless AP 200 is located for smooth wireless communication.

The electronic device 100 according to an embodiment may display the user interface using the edge region of the display 10, and thus may guide the location of the wireless AP 200 without disturbing the user's intention to proceed with various operations (e.g., searching the Internet, reading a document, etc.).

Figure 3:
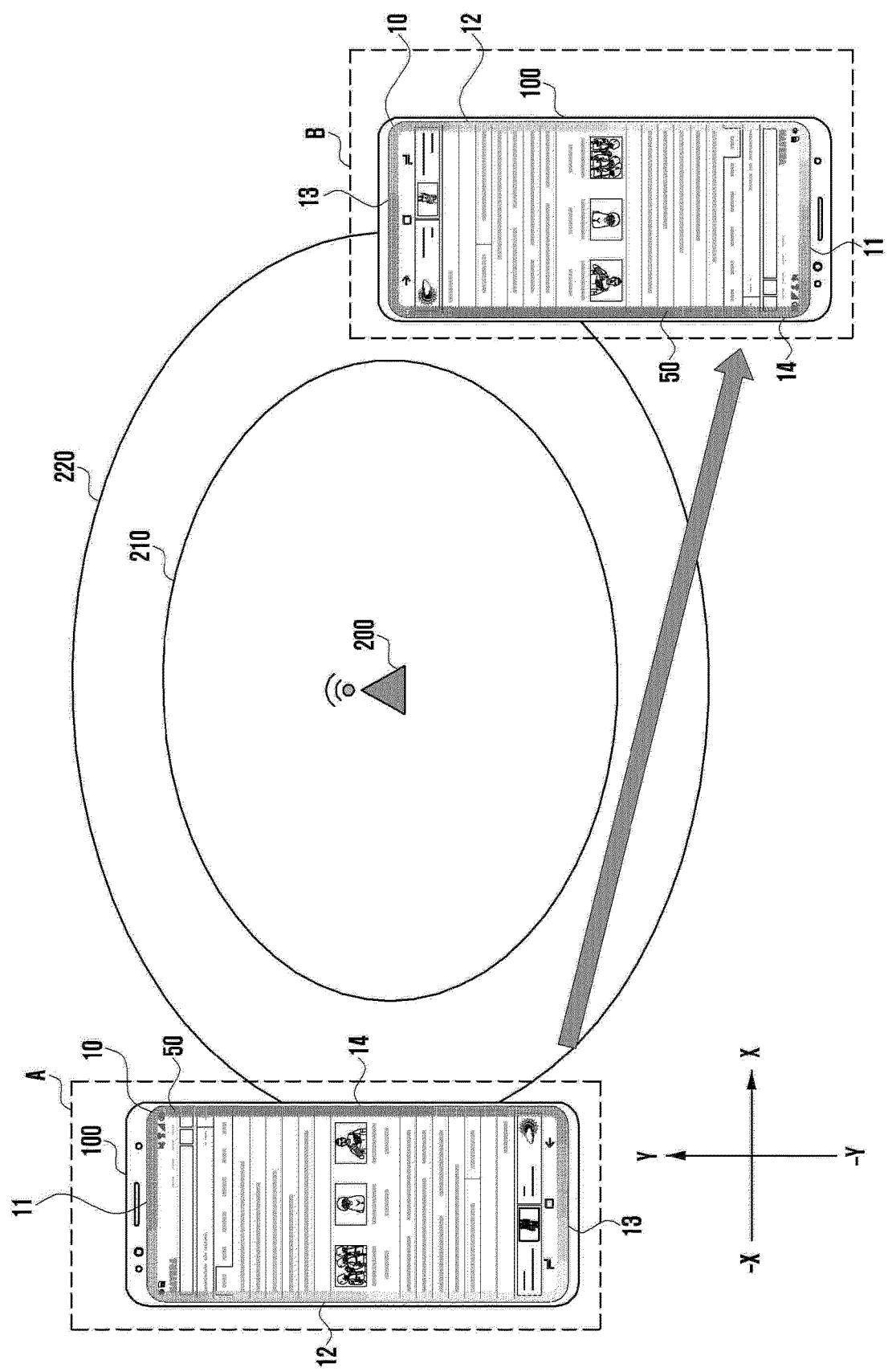
FIG. 3 is a diagram illustrating a situation in which an electronic device according to an embodiment displays a user interface using a positional relationship with a wireless AP.

FIG. 3 is a diagram illustrating a situation in which an electronic device according to an embodiment displays a user interface using a positional relationship with a wireless AP.

Referring to FIG. 3, the electronic device 100 may be positioned in various places among the second regions 220. The electronic device 100 may display the user interface using a relative positional relationship with the wireless AP 200 and posture information of the electronic device 100.

The electronic device 100 according to an embodiment may acquire the movement information of the electronic device 100 related to the posture and direction of the electronic device 100 using, for example, a sensor module. The sensor module may include, for example, a gesture sensor, a gyro sensor, a magnetic sensor, an acceleration sensor, a grip sensor, a proximity sensor, and the like.

According to an embodiment, the electronic device 100 may be positioned in region A. The region A is a region in which the electronic device 100 is located in −X and +Y directions with respect to the position of the wireless AP 200.

When the electronic device 100 according to an embodiment moves from the first area to the second area 220, it can be seen that the communication transmission/reception sensitivity with the wireless AP 200 decreases. The electronic device 100 may display the user interface 50 on the display 10 when a distance from the wireless AP 200 increases and the communication transmission/reception sensitivity with the wireless AP 200 decreases.

Referring to FIG. 3, in order to display the direction in which the wireless AP 200 is located, the electronic device 100 may display the user interface 50 having a predetermined color and shape in the fourth edge region 14 of the display 10. In this case, the electronic device 100 may display the user interface 50 to which the gradation effect is applied in a portion of the first edge region 11 adjacent to the fourth edge region 14 and a portion of the third edge region 13 adjacent to the fourth edge region 14.

According to various embodiments, the electronic device 100 may move from region A to a region B. The region B is a region in which the electronic device 100 is located in +X and −Y directions with respect to the position of the wireless AP 200. In this case, the user may use the electronic device 100 with an upper end facing in the −Y direction.

Referring to FIG. 3, the electronic device 100 may display the user interface 50 having a predetermined color and shape in the third edge region 13 and the fourth edge region 14 of the display to indicate a direction in which the wireless AP 200 is located. In this case, the electronic device 100 may display the user interface 50 to which the gradation effect is applied on a portion of the first edge region 11 adjacent to the fourth edge region 14.

In this manner, the electronic device 100 according to an embodiment may display the user interface 50 using information related to a posture or a direction in which the user uses the electronic device 100.

Figure 4:
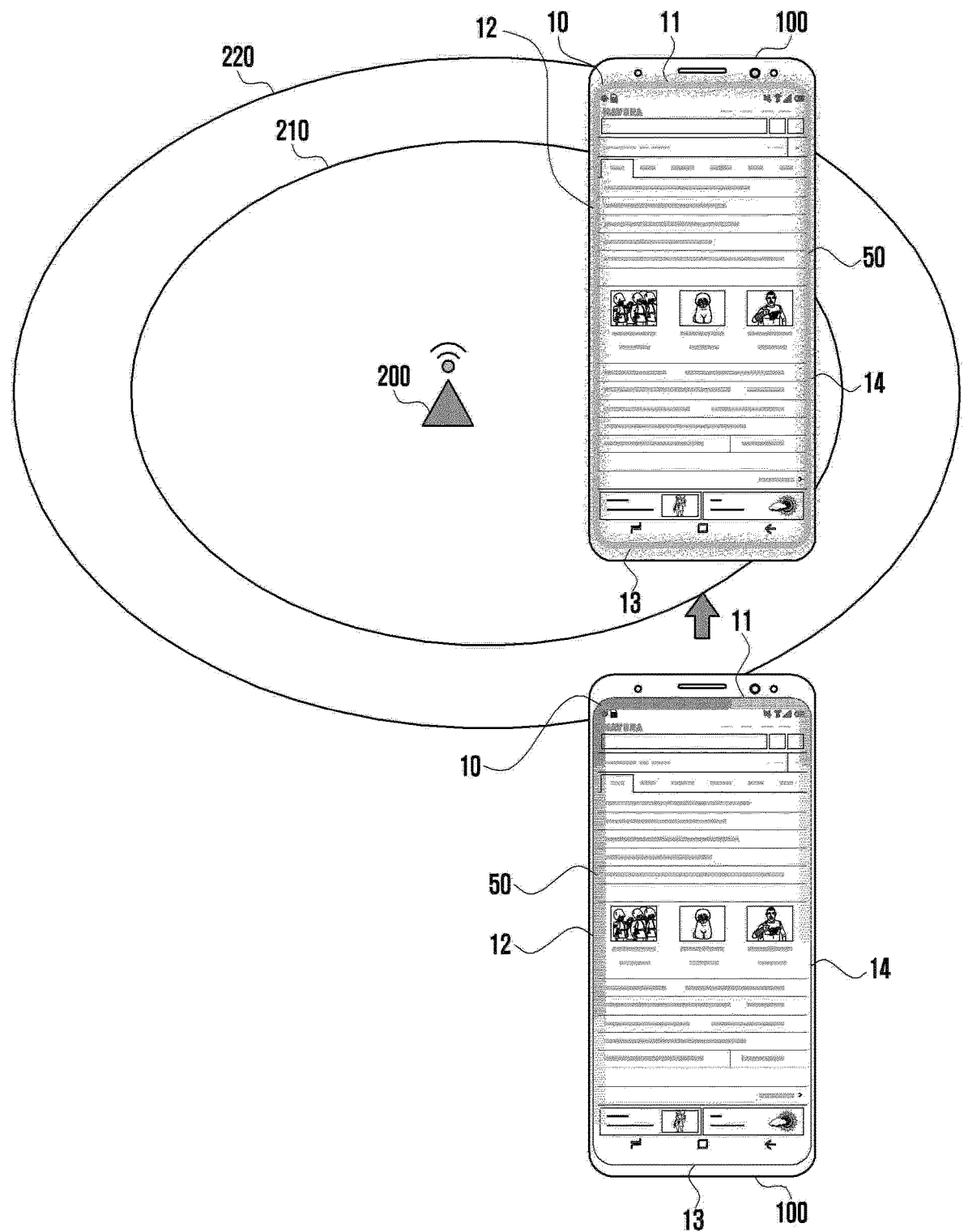
FIG. 4 is a diagram illustrating a situation in which a user interface is displayed while a distance between an electronic device according to an embodiment and an external electronic device decreases.

FIG. 4 is a diagram illustrating a situation in which a user interface is displayed while a distance between an electronic device according to an embodiment and an external electronic device decreases.

Referring to FIG. 4, the electronic device 100 may enter the communication possible area of the wireless AP 200.

According to an embodiment, when the electronic device 100 enters the second area 220, the electronic device 100 may establish a communication relationship with the wireless AP 200. For example, when the electronic device 100 first establishes a communication relationship with the wireless AP 200, the electronic device 100 and the wireless AP 200 may establish a communication relationship through an operation of defining a mutual communication interface.

After establishing the communication relationship with the wireless AP 200, the electronic device 100 according to an embodiment may confirm the communication transmission/reception sensitivity with the wireless AP 200. When the communication transmission/reception sensitivity is lower than a predetermined value, the electronic device 100 may display the user interface 50 on the display 10.

The electronic device 100 according to an embodiment may display a direction in which the wireless AP 200 is located using the user interface 50. For example, the electronic device 100 may display the user interface 50 in the first edge region 11 and the second edge region 12 adjacent to the direction in which the wireless AP 200 is located.

According to an embodiment, the electronic device 100 may display the user interface 50 in a predetermined color in the first edge region 11 and the second edge region 12. In this case, the electronic device 100 may display a color in which a gradient effect is applied to a portion of the fourth edge region 14 adjacent to the first edge region 11.

Referring to FIG. 4, the electronic device 100 may move to the first area 210.

According to an embodiment, when the electronic device 100 moves from the second area 220 to the first area 210, it can be seen that the electronic device 100 becomes closer to the wireless AP 200 and the communication transmission/reception sensitivity with the wireless AP 200 increases.

When the electronic device 100 according to an embodiment moves to the first area 210 so that the communication transmission/reception sensitivity with the wireless AP 200 increases and the electronic device 100 becomes closer to the wireless AP 200, the electronic device 100 may change and display the property of the user interface 50 displayed on the display 10.

For example, the electronic device 100 may display the user interface 50 using a predetermined color in all the edge regions 11, 12, 13, and 14 of the display 10. In this case, the color displayed by the user interface 50 may be different from a color displayed after the electronic device 100 moves to the second area 220. According to various embodiments, the electronic device 100 may display the user interface 50 by flickering and displaying the changed color.

The electronic device 100 according to an embodiment may display the user interface 50 on all edge regions 11, 12, 13, and 14 of the display 10 for a predetermined time. Also, the electronic device 100 may display a pop-up message indicating that the reception sensitivity with the wireless AP 200 is in a good state.

According to various embodiments, when the electronic device 100 moves from the second area 220 to the first area 210, the electronic device 100 may terminate the display of the user interface 50.

Figure 5:
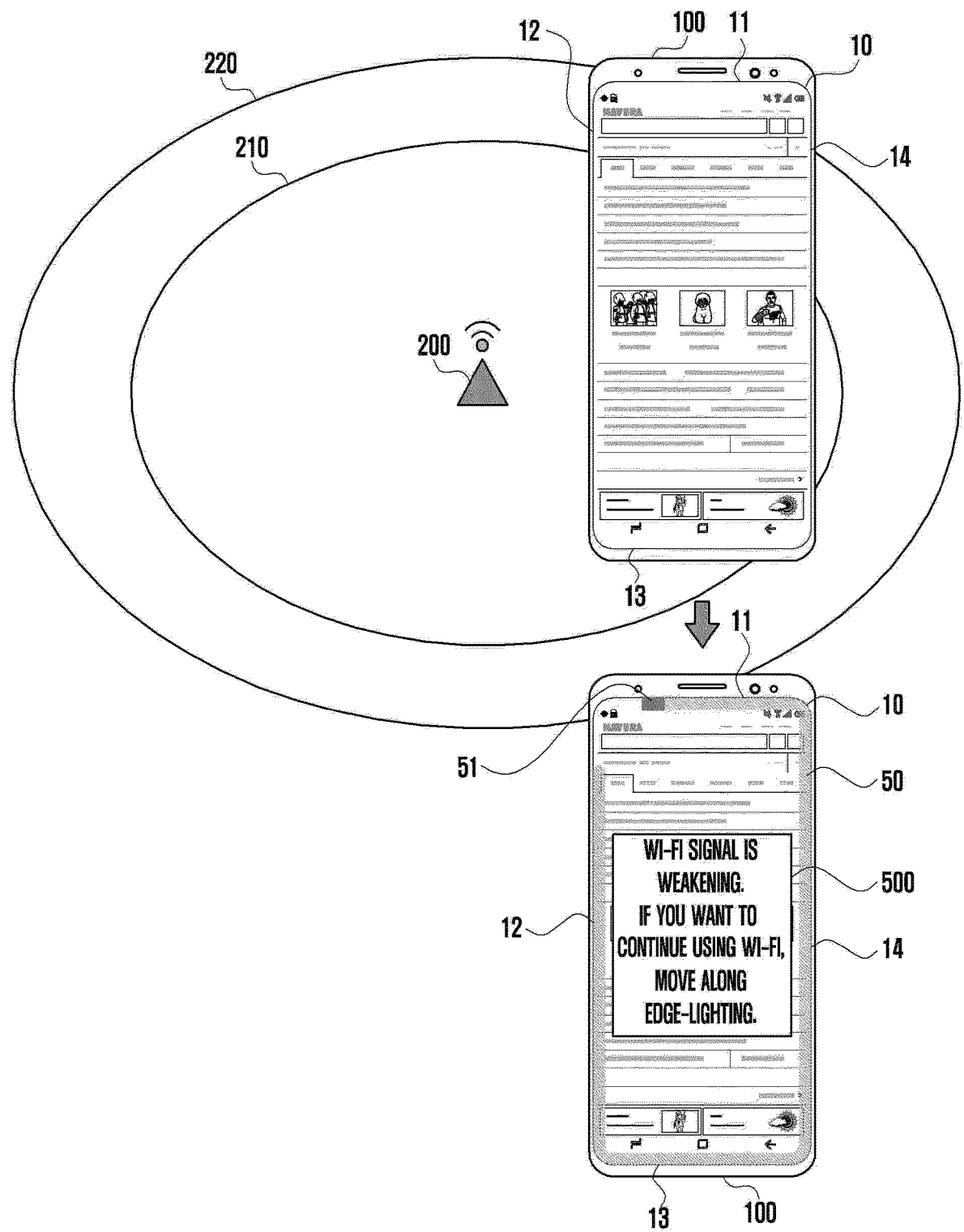
FIG. 5 is a diagram illustrating another embodiment in which a user interface is displayed while a distance between an electronic device according to an embodiment and an external electronic device increases.

FIG. 5 is a diagram illustrating another embodiment in which a user interface is displayed while a distance between an electronic device according to an embodiment and an external electronic device increases.

Referring to FIG. 5, when the electronic device 100 moves out of the first area 210 and moves to the second area 220 and a distance from the wireless AP 200 increases, the electronic device 100 may confirm that the communication transmission/reception sensitivity with the wireless AP 200 decreases.

The electronic device 100 according to an embodiment may display the user interface 50 on the display 10 when the distance from the wireless AP 200 increases so that the communication transmission/reception sensitivity with the wireless AP 200 decreases. The electronic device 100 may display the user interface 50 along, for example, at least one edge region of the display 10.

According to an embodiment, the electronic device 100 may display a direction in which the wireless AP 200 is located using the user interface 50. For example, the electronic device 100 may display the user interface 50 that generates an effect such as the color moving along the edge regions 11, 12, 13, and 14 of the display 10, starting from a position where the first edge region 11 and the second edge region 12 adjacent to a direction in which the wireless AP 200 is located meet.

Specifically, the start point 51 of the user interface 50 may be displayed at the position where the first edge region 11 and the second edge region 12 meet (e.g., a region adjacent to the wireless AP 200 among the edge regions of the display 10), and may then move in a direction of the second edge region 12. Next, the start point 51 may pass through the third edge region 13, the fourth edge region 14, and the first edge region 11, and may disappear adjacent to the position where the first edge region 11 and the second edge region 12 meet again. However, the disclosure is not limited thereto. For example, the start point 51 may move in the order of the first edge region 11, the fourth edge region 14, the third edge region 13, and the second edge region 12.

The electronic device 100 according to an embodiment may continuously display the user interface 50 displayed by the above-described method to inform the user of the location of the wireless AP 200.

According to an embodiment, the electronic device 100 may display information indicating a decrease in the reception sensitivity simultaneously or sequentially with the user interface 50 on the display 10. For example, the electronic device 100 may display the information indicating the decrease in the reception sensitivity and the content requesting to move the electronic device 100 along the user interface 50 on the display 10 as a pop-up message 500.

The electronic device 100 may display the pop-up message 500 for a predetermined time and may then terminate the display. However, the disclosure is not limited thereto, and the electronic device 100 may continue to display the pop-up message 500.

Figure 6:
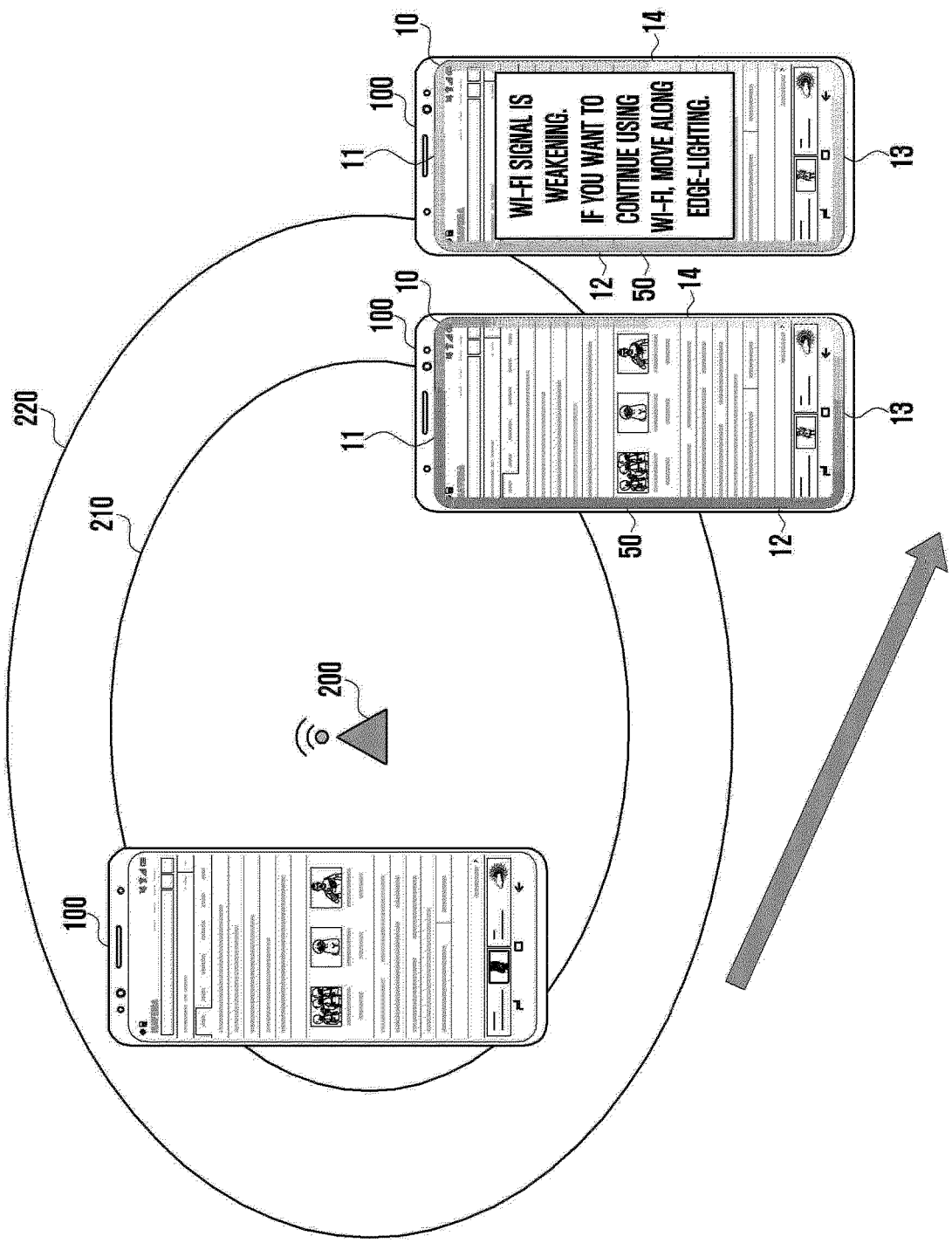
FIG. 6 is a diagram illustrating a situation in which a user interface is sequentially displayed while a distance between an electronic device according to an embodiment and a wireless AP increases.

FIG. 6 is a diagram illustrating a situation in which a user interface is sequentially displayed while a distance between an electronic device according to an embodiment and a wireless AP increases.

Referring to FIG. 6, when the electronic device 100 moves out of the first area 210 and moves to the second area 220 and a distance from the wireless AP 200 increases, the electronic device 100 may confirm that the communication transmission/reception sensitivity with the wireless AP 200 decreases.

The electronic device 100 according to an embodiment may display the user interface 50 on the display 10 when the distance between the wireless AP 200 and the electronic device 100 increases to cause the decrease in the communication transmission/reception sensitivity with the wireless AP 200. The electronic device 100 may display the user interface 50 along, for example, at least one edge region of the display 10.

According to an embodiment, the electronic device 100 may display a situation in which the communication transmission/reception sensitivity with the wireless AP 200 decreases or a situation in which the distance between the electronic device 100 and the wireless AP 200 increases, on the display 10 using the user interface 50.

Referring to FIG. 6, the electronic device 100 may display the user interface 50 having a predetermined color and shape in the first edge region 11 and the second edge region 12. In this case, the electronic device 100 may apply an effect of flickering at a predetermined period by adjusting the brightness of the color.

When the electronic device 100 further moves outside the second area 220, the electronic device 100 may change and display the properties of the user interface 50. For example, the electronic device 100 may indicate that the communication transmission/reception sensitivity between the electronic device 100 and the wireless AP 200 decreases by making a flickering cycle slower. According to another embodiment, the electronic device 100 may indicate that the communication transmission/reception sensitivity between the electronic device 100 and the wireless AP 200 further decreases by dimming the color of the user interface 50.

According to various embodiments, the electronic device 100 may display the user interface as moving along the edge region of the display 10 as shown in FIG. 5. In this case, when the electronic device 100 moves outside the second area 220, the electronic device 100 may display the user interface as if the user interface moves faster along the edge region of the display 10. However, the disclosure is not limited thereto, and the electronic device 100 may display the user interface as if the user interface moves more slowly along the edge region of the display 10.

Figure 7:
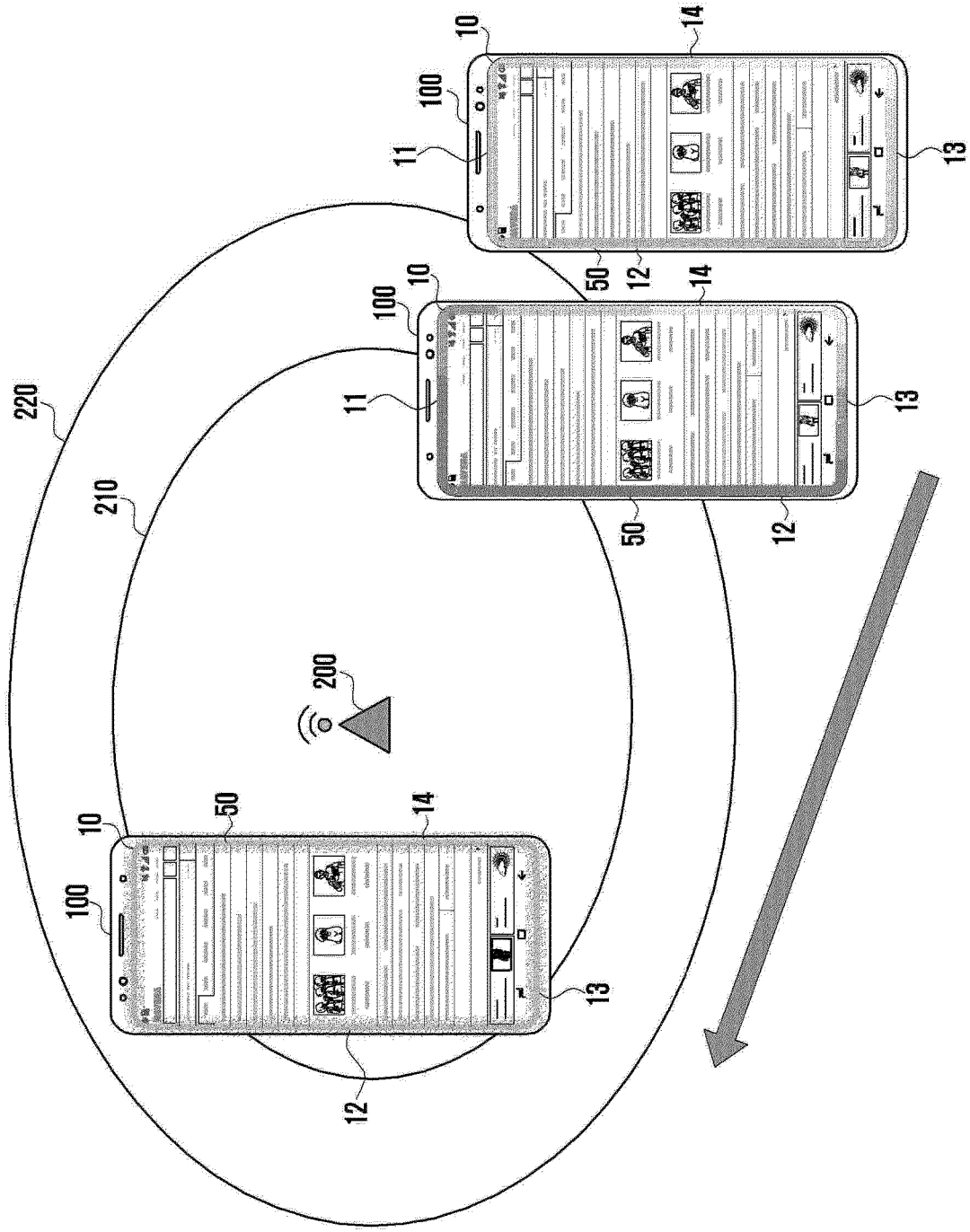
FIG. 7 is a diagram illustrating a situation in which a user interface is sequentially displayed while a distance between an electronic device according to an embodiment and a wireless AP decreases.

FIG. 7 is a diagram illustrating a situation in which a user interface is sequentially displayed while a distance between an electronic device according to an embodiment and a wireless AP decreases.

Referring to FIG. 7, when the electronic device 100 moves from the second area 220 to the first area 210 and becomes closer to the wireless AP 200, the electronic device 100 may confirm that the communication transmission/reception sensitivity with the wireless AP 200 increases.

The electronic device 100 according to an embodiment may display the user interface 50 on the display 10 when the electronic device 100 becomes closer to the wireless AP 200 and the communication transmission/reception sensitivity increases. The electronic device 100 may display the user interface 50 along, for example, at least one edge region of the display 10.

According to an embodiment, the electronic device 100 may display a situation in which the communication transmission/reception sensitivity with the wireless AP 200 increases or a situation in which the electronic device 100 becomes closer to the wireless AP 200, on the display 10 using the user interface 50.

Referring to FIG. 7, the electronic device 100 may display the user interface 50 having a predetermined color and shape in the first edge region 11 and the second edge region 12. In this case, the electronic device 100 may apply an effect of flickering at a predetermined period by adjusting the brightness of the color.

When the electronic device 100 further moves inside the second area 220, the electronic device 100 may change and display the properties of the user interface 50. For example, the electronic device 100 may indicate that the communication transmission/reception sensitivity between the electronic device 100 and the wireless AP 200 increases by making the flickering cycle faster. According to another embodiment, the electronic device 100 may change the color of the user interface 50 to indicate that the communication transmission/reception sensitivity between the electronic device 100 and the wireless AP 200 further increases. According to another embodiment, the electronic device 100 may darkly display the color of the user interface 50 to indicate that the communication transmission/reception sensitivity between the electronic device 100 and the wireless AP 200 further decreases.

According to various embodiments, the electronic device 100 may display the user interface as moving along the edge region of the display 10 as shown in FIG. 5. In this case, when the electronic device 100 moves inside the second area 220, the electronic device 100 may display the user interface as if the user interface moves more slowly along the edge region of the display 10. However, the disclosure is not limited thereto, and the electronic device 100 may display the user interface as if the user interface moves faster along the edge region of the display 10.

According to an embodiment, when the electronic device 100 enters the first area 210 or when the communication transmission/reception sensitivity between the electronic device 100 and the wireless AP 200 is greater than or equal to a predetermined value, the electronic device 100 may change and display the properties of the user interface 50. For example, the electronic device 100 may change the color being displayed and may display the user interface 50 on all the edge regions 11, 12, 13, and 14 of the display 10.

Figure 8:
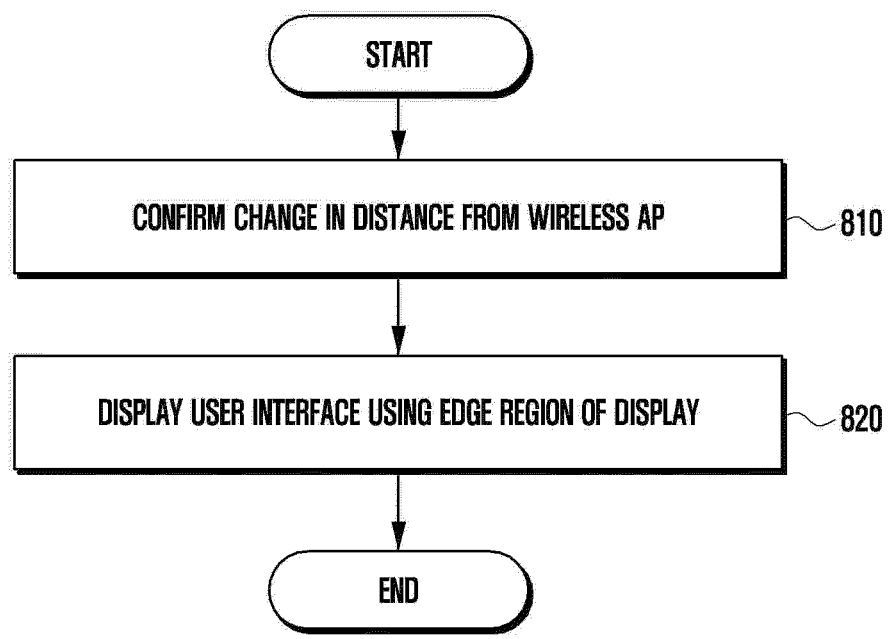
FIG. 8 is a flowchart illustrating a situation in which an electronic device according to an embodiment displays a user interface using location information between the electronic device and a wireless AP.

FIG. 8 is a flowchart illustrating a situation in which an electronic device according to an embodiment displays a user interface using location information between the electronic device and a wireless AP.

Referring to operation 810, the electronic device 100 may confirm a change in a distance from the wireless AP.

According to an embodiment, the electronic device 100 may confirm the change in the distance from the wireless AP by using strength information of a signal received from the wireless AP and location information of the electronic device 100. According to various embodiments, the electronic device 100 may confirm the change in the distance from the wireless AP by using a phase difference between signals transmitted and received to and from the wireless AP.

Referring to operation 820, the electronic device 100 may display a user interface for displaying the direction of the wireless AP using the edge region of the display.

According to an embodiment, the electronic device 100 may display a user interface having a shape of a line or a narrow surface in a narrow and long region extended along the edge region adjacent to the edge of the display. The user interface may be displayed in a predetermined color.

According to an embodiment, the electronic device 100 may display the user interface in the edge region of the display adjacent to a direction in which the wireless AP is located.

The electronic device 100 may display the direction in which the wireless AP is located using the edge region, so that a user may use other functions of the electronic device 100 using the display while confirming the user interface.

Figure 9:
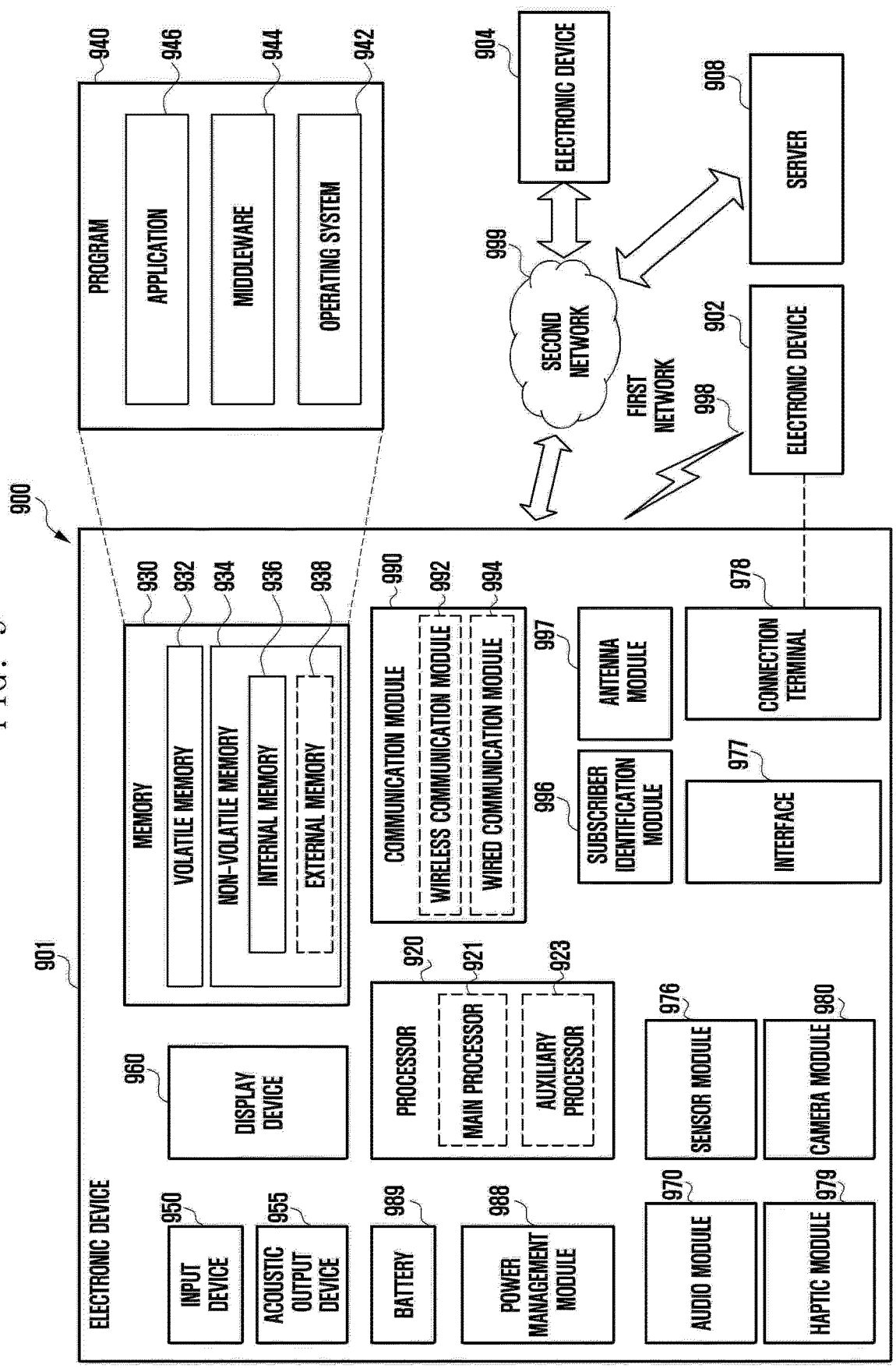
FIG. 9 is a block diagram illustrating an electronic device in a network environment according to various embodiments.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

An electronic device 901 according to an embodiment may include: a communication circuit; a display; a processor; and a memory configured to be electrically connected to the processor, wherein the memory may store instructions which are configured to cause the processor to display a user interface including location information of an external device that transmits and receives a signal through the communication circuit, in a narrow and long region extended along at least one edge region formed in the display, by controlling the display.

In the electronic device 901 according to an embodiment, the memory may store instructions which are configured to cause the processor to acquire the location information by using signal strength information related to the external device, which is received through the communication circuit, and movement information of the electronic device 901.

In the electronic device 901 according to an embodiment, the signal strength information may include a received signal strength indicator (RSSI).

In the electronic device 901 according to an embodiment, the electronic device 901 may further include a sensor module, and the memory may store instructions which are configured to cause the processor to acquire the movement information of the electronic device 901 using the sensor module.

In the electronic device 901 according to an embodiment, the memory may store instructions which are configured to cause the processor to acquire the location information of the external device using a phase difference of signals transmitted and received to and from the external device.

In the electronic device 901 according to an embodiment, the memory may store at least one of a shape, a color, a movement effect, a direction in which the movement effect proceeds, a speed at which the movement effect proceeds, a start point and an end point displaying the movement effect, or a display time as property information of the user interface.

In the electronic device 901 according to an embodiment, the memory may store instructions which are configured to cause the processor to display the user interface in the edge region adjacent to the external device by controlling the display in a situation in which a distance between the electronic device 901 and the external device exceeds a predetermined value and increases.

In the electronic device 901 according to an embodiment, the memory may store instructions which are configured to cause the processor to display the user interface in all the edge regions formed in the display by controlling the display in a situation in which the distance between the electronic device 901 and the external device reduces within a predetermined value.

In the electronic device 901 according to an embodiment, the memory may store instructions which are configured to cause the processor to change and display at least one of the property information of the user interface in a situation in which the distance between the electronic device 901 and the external device is changed.

Figure 10:
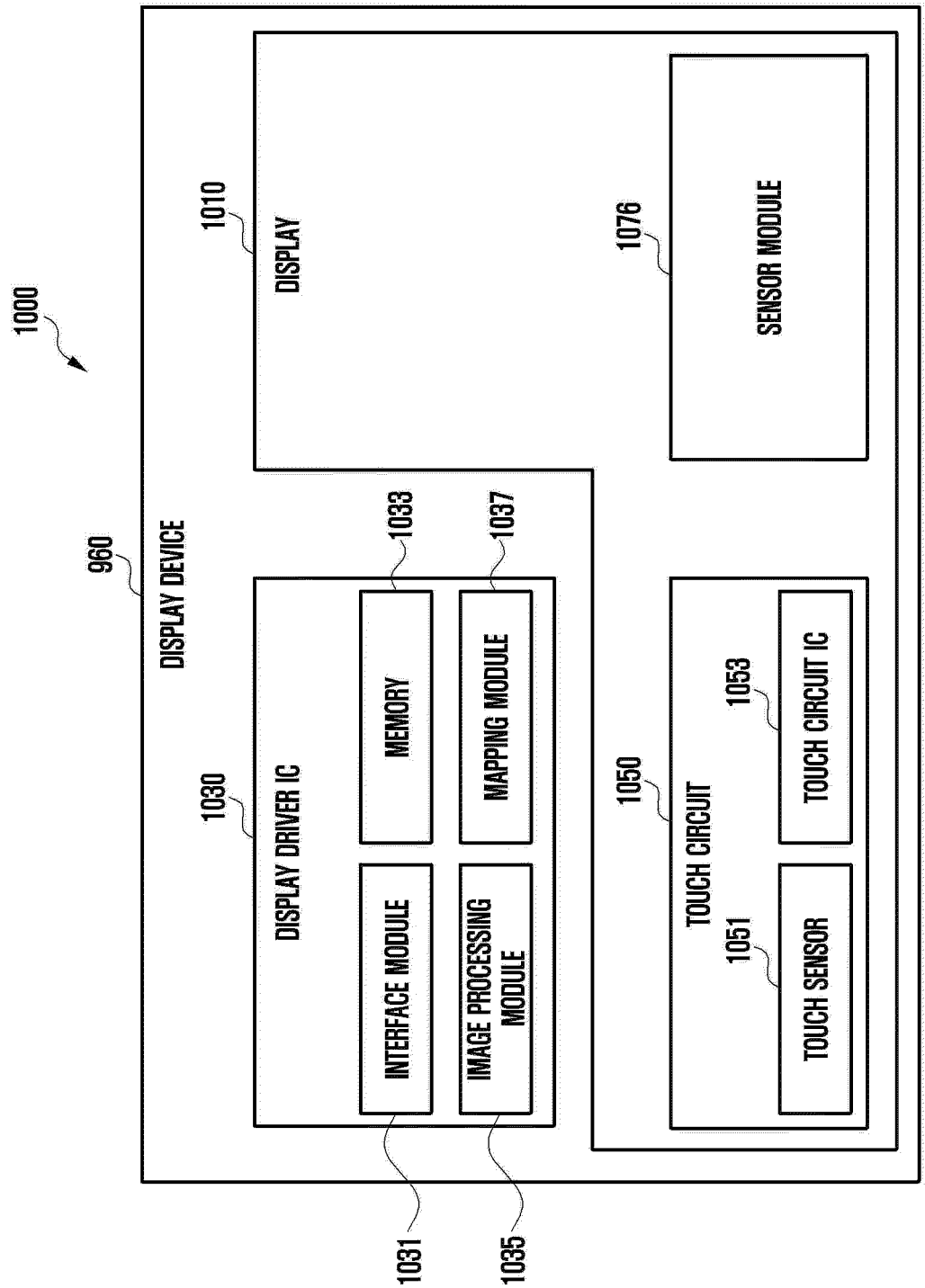
FIG. 10 is a block diagram illustrating a display device according to various embodiments.

FIG. 10 is a block diagram 1000 illustrating the display device 960 according to various embodiments. Referring to FIG. 10, the display device 960 may include a display 1010 and a display driver integrated circuit (DDI) 1030 to control the display 1010. The DDI 1030 may include an interface module 1031, memory 1033 (e.g., buffer memory), an image processing module 1035, or a mapping module 1037. The DDI 1030 may receive image information that contains image data or an image control signal corresponding to a command to control the image data from another component of the electronic device 901 via the interface module 1031. For example, according to an embodiment, the image information may be received from the processor 920 (e.g., the main processor 921 (e.g., an application processor)) or the auxiliary processor 923 (e.g., a graphics processing unit) operated independently from the function of the main processor 921. The DDI 1030 may communicate, for example, with touch circuitry 950 or the sensor module 976 via the interface module 1031. The DDI 1030 may also store at least part of the received image information in the memory 1033, for example, on a frame by frame basis. The image processing module 1035 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1010. The mapping module 1037 may generate a voltage value or a current value corresponding to the image data pre-processed or post-processed by the image processing module 1035. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1010 may be driven, for example, based at least in part on the voltage value or the current value such that visual information (e.g., a text, an image, or an icon) corresponding to the image data may be displayed via the display 1010.

According to an embodiment, the display device 960 may further include the touch circuitry 1050. The touch circuitry 1050 may include a touch sensor 1051 and a touch sensor IC 1053 to control the touch sensor 1051. The touch sensor IC 1053 may control the touch sensor 1051 to sense a touch input or a hovering input with respect to a certain position on the display 1010. To achieve this, for example, the touch sensor 1051 may detect (e.g., measure) a change in a signal (e.g., a voltage, a quantity of light, a resistance, or a quantity of one or more electric charges) corresponding to the certain position on the display 1010. The touch circuitry 1050 may provide input information (e.g., a position, an area, a pressure, or a time) indicative of the touch input or the hovering input detected via the touch sensor 1051 to the processor 920. According to an embodiment, at least part (e.g., the touch sensor IC 1053) of the touch circuitry 1050 may be formed as part of the display 1010 or the DDI 1030, or as part of another component (e.g., the auxiliary processor 923) disposed outside the display device 960.

According to an embodiment, the display device 960 may further include at least one sensor (e.g., a fingerprint sensor, an iris sensor, a pressure sensor, or an illuminance sensor) of the sensor module 976 or a control circuit for the at least one sensor. In such a case, the at least one sensor or the control circuit for the at least one sensor may be embedded in one portion of a component (e.g., the display 1010, the DDI 1030, or the touch circuitry 950)) of the display device 960. For example, when the sensor module 976 embedded in the display device 960 includes a biometric sensor (e.g., a fingerprint sensor), the biometric sensor may obtain biometric information (e.g., a fingerprint image) corresponding to a touch input received via a portion of the display 1010. As another example, when the sensor module 976 embedded in the display device 960 includes a pressure sensor, the pressure sensor may obtain pressure information corresponding to a touch input received via a partial or whole area of the display 1010. According to an embodiment, the touch sensor 1051 or the sensor module 976 may be disposed between pixels in a pixel layer of the display 1010, or over or under the pixel layer.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a communication circuit;
   a display;
   a processor; and
   a memory configured to be electrically connected to the processor,
   wherein the memory stores instructions which, when executed, configure the processor to:
      acquire position information of an external electronic device to which the electronic device transmits and receives signals through the communication circuit; and
      control to display on the display a user interface comprising an elongated region extending along at least one edge region of the display,
   wherein the control controls a property of the elongated region, based on the position information, to indicate a relative positional relationship of the external electronic device to the electronic device.

2. The electronic device of claim 1, wherein the instructions configure the processor to acquire the position information of the external electronic device using signal strength information related to the external electronic device, which is received through the communication circuit, and movement information of the electronic device.

3. The electronic device of claim 2, wherein the signal strength information comprises a received signal strength indicator (RSSI).

4. The electronic device of claim 2, further comprising:
   a sensor,
   wherein the instructions configure the processor to acquire the movement information of the electronic device using the sensor.

5. The electronic device of claim 1, wherein the instructions configure the processor to acquire the position information of the external electronic device using a phase difference of signals transmitted to and received from the external electronic device.

6. The electronic device of claim 1, wherein the property comprises at least one of a shape, a color, a movement effect, a direction in which the movement effect proceeds, a speed at which the movement effect proceeds, a start point and an end point displaying the movement effect, or a display time.

7. The electronic device of claim 1, wherein the instructions configure the processor to control to display the user interface in an edge region adjacent to the external electronic device based on a distance between the electronic device and the external electronic device exceeding a predetermined value and increasing.

8. The electronic device of claim 1, wherein the instructions configure the processor to control to display the user interface in all the edge regions based on a distance between the electronic device and the external electronic device being less than a predetermined value.

9. The electronic device of claim 6, wherein the instructions configure the processor to change and display at least one property of the elongated region based on changing of a distance between the electronic device and the external electronic device.

10. The electronic device of claim 1, wherein the elongated region is controlled to indicate a distance relationship of the external electronic device to the electronic device.

11. The electronic device of claim 1, wherein the elongated region is controlled to indicate a directional relationship of the external electronic device to the electronic device.

12. A method of controlling an electronic device, the method comprising:
   acquiring position information of an external electronic device that transmits signals to and receives signals from the electronic device through a communication circuit of the electronic device; and
   controlling a display of the electronic device to display a user interface comprising an elongated region extending along at least one edge region of a display of the electronic device, wherein the controlling controls a property of the elongated region, based on the position information, to indicate a relative positional relationship of the external electronic device to the electronic device.

13. The method of claim 12, wherein the position information is acquired using signal strength information related to the external electronic device, which is received through the communication circuit, and movement information of the electronic device.

14. The method of claim 12, wherein the position information of the external electronic device is acquired using a phase difference of the signals transmitted and received through the communication circuit.

15. The method of claim 12, wherein the property comprises at least one of a shape, a color, a movement effect, a direction in which the movement effect proceeds, a speed at which the movement effect proceeds, a start point and an end point displaying the movement effect, or a display time.

16. The method of claim 12, further comprising:
displaying the user interface in an edge region adjacent to the external electronic device based on a distance between the electronic device and the external electronic device exceeding a predetermined value and increasing; and
displaying the user interface in all the edge regions based on a distance between the electronic device and the external electronic device being less than the predetermined value.

17. The method of claim 15, further comprising:
changing and displaying at least one property of the elongated region based on changing of a distance between the electronic device and the external electronic device.

18. The method of claim 12, wherein the elongated region is controlled to indicate a distance relationship of the external electronic device to the electronic device.

19. The method of claim 12, wherein the elongated region is controlled to indicate a directional relationship of the external electronic device to the electronic device.

\* \* \* \* \*